Sept. 4, 1956     A. WIESNER     2,761,398
DEFROSTING MECHANISM
Filed March 2, 1953     6 Sheets—Sheet 1
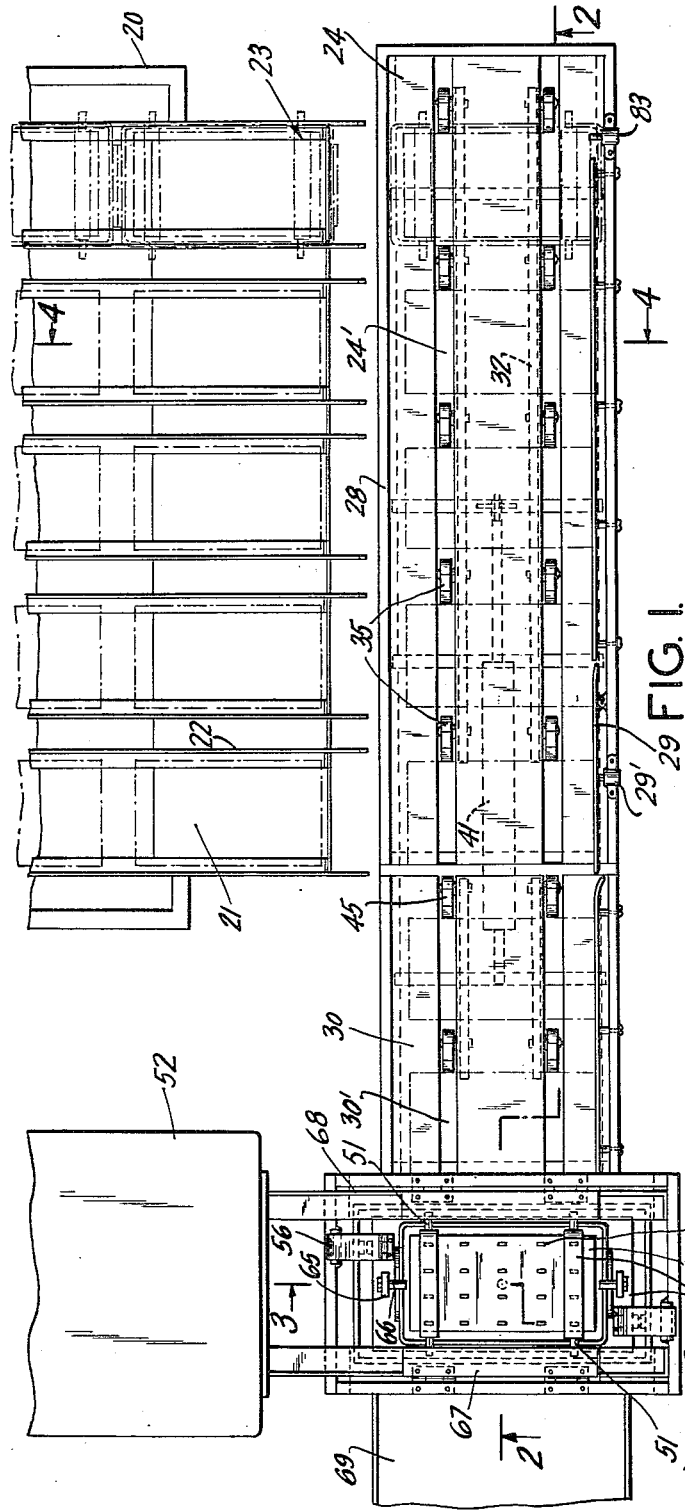
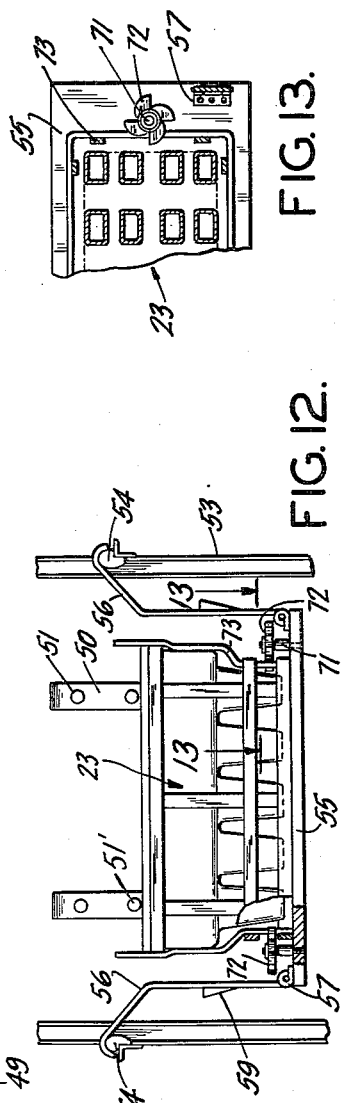
INVENTOR.
ALFRED WIESNER
BY
*Campbell Brumbaugh Free & Graves*
his ATTORNEYS Sept. 4, 1956

A. WIESNER 2,761,398

DEFROSTING MECHANISM

Filed March 2, 1953

INVENTOR.
ALFRED WIESNER

BY
Campbell Brumbaugh Freer Graves his ATTORNEYS.

Sept. 4, 1956     A. WIESNER     2,761,398
DEFROSTING MECHANISM

Filed March 2, 1953     6 Sheets-Sheet 3

INVENTOR.
ALFRED WIESNER
BY
*Campbell Brumbaugh Free & Graves*
his ATTORNEYS.

Sept. 4, 1956  A. WIESNER  2,761,398
DEFROSTING MECHANISM
Filed March 2, 1953  6 Sheets-Sheet 4

INVENTOR.
ALFRED WIESNER
BY
*his* ATTORNEYS.

Sept. 4, 1956
A. WIESNER
2,761,398
DEFROSTING MECHANISM
Filed March 2, 1953
6 Sheets-Sheet 5
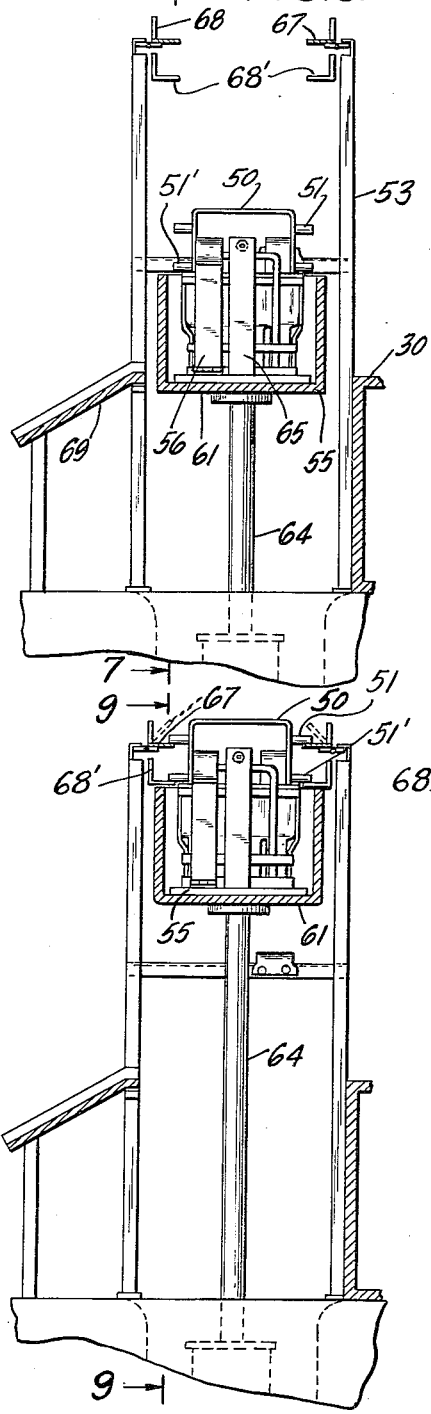
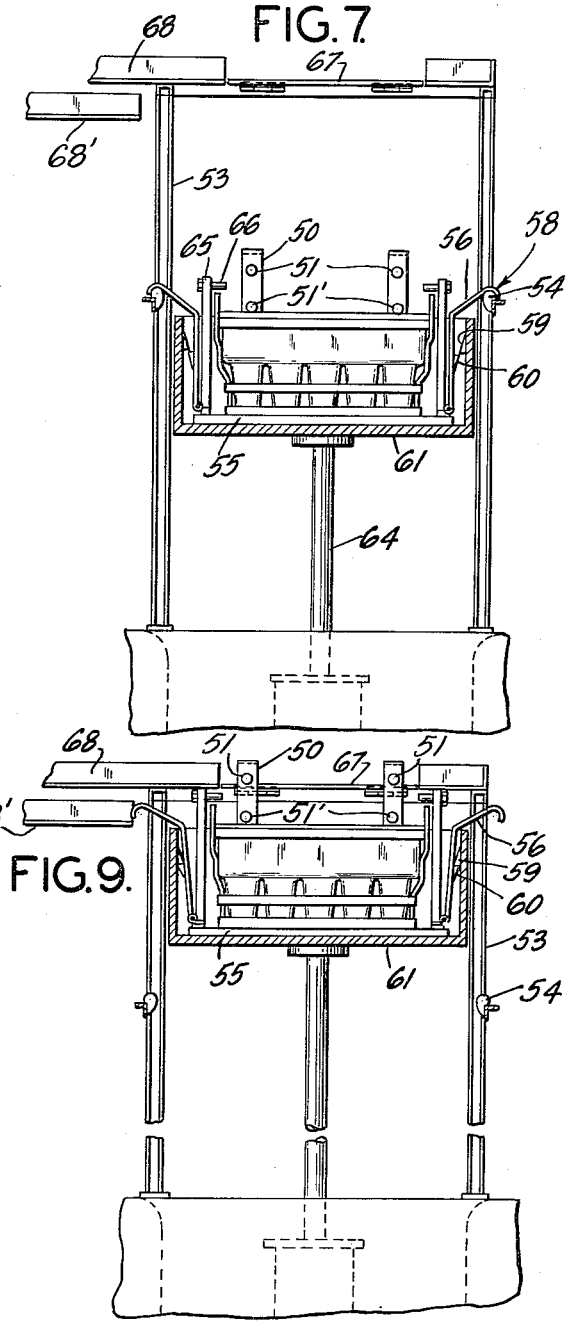
INVENTOR.
ALFRED WIESNER Sept. 4, 1956

A. WIESNER 2,761,398

DEFROSTING MECHANISM

Filed March 2, 1953

INVENTOR.
ALFRED WIESNER

BY
Campbell, Brumbaugh, Free & Graves
his ATTORNEYS

United States Patent Office 2,761,398
Patented Sept. 4, 1956

2,761,398

DEFROSTING MECHANISM

Alfred Wiesner, Rome, Italy, assignor to Wisbar Corporation, New York, N. Y., a corporation of New York Application March 2, 1953, Serial No. 339,734

Claims priority, application Italy June 17, 1952

13 Claims. (Cl. 107—8)

The present invention relates to mechanisms for use in connection with the manufacture of frozen comestibles or novelties, and embodies more specifically a machine by means of which molds of frozen comestibles may be conveyed from the mechanism in which the freezing operation is performed to an apparatus in which the comestibles are surface-defrosted and removed from the molds and then conveyed to a subsequent treating operation.

In commercial operations of this type the above molds are of such structure as to form a multiplicity of comestibles in one operation, and additionally, a multiplicity of molds are simultaneously processed in the freezing operation. The proper handling of these molds thus becomes a serious problem, and it is an object of this invention to provide mechanism by means of which these operations may be properly performed in sequence and so controlled that each step is performed under optimum conditions. In this connection the invention contemplates the provision of means to coordinate the various operations in such fashion that each may be properly performed to insure a smooth and steady flow of the molds and comestibles at all times.

These and other objects of the invention will be more fully understood by reference to the accompanying drawings, wherein Figure 1 is a plan view showing feed mechanism and related defrosting mechanism constructed in accordance with this invention;

Figure 6 is a view in transverse section showing the defrosting mechanism in an initial stage of operation;

Figure 7 is a view in longitudinal vertical section showing the mechanism of Figure 6;

Figure 8 is a view similar to Figure 6, but with the parts in a subsequent defrosting position;

Figure 9 is a view similar to Figure 7 showing the parts in the position illustrated in Figure 8;

Figure 12 is a view similar to Figure 3 showing a modified form of mold retaining mechanism;

Figure 13 is a view in partial section taken on the plane indicated by the line 13—13 of Figure 12.

Figures 2, 10:
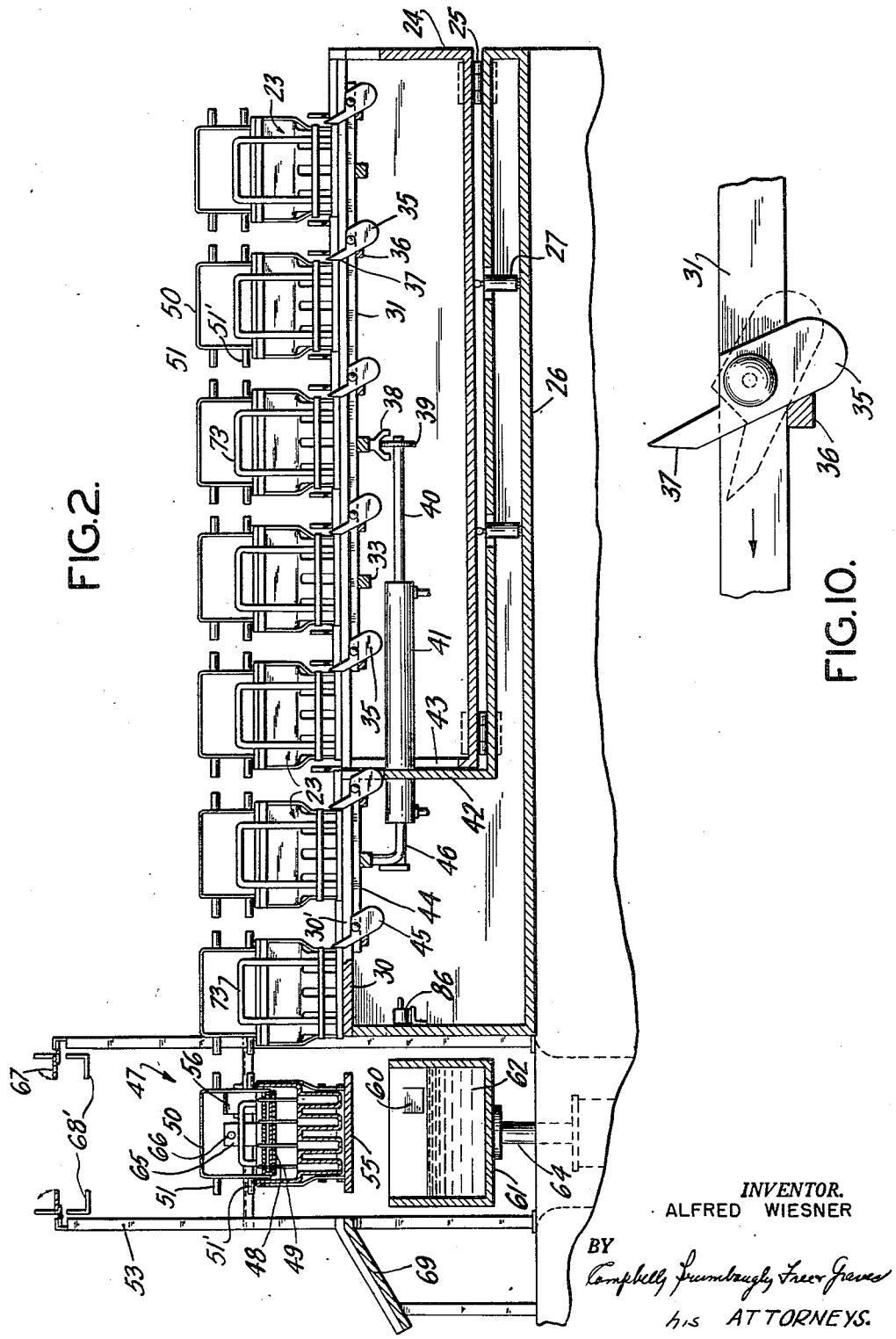
Figure 2 is a view in longitudinal section, taken on line 2—2 of Figure 1, and looking in the direction of the arrows.
Figure 10 is an enlarged detail view showing the structure of the mold advancing mechanism.

Referring to the above drawings and particularly to Figure 1, there is illustrated a freezing machine at 20, this mechanism being, for example, a brine tank provided with a sloping drainboard 21 having spaced guide flanges 22 between which a multiplicity of molds 23 are advanced. Although the drawings illustrate five molds abreast, this number may be varied as desired. As described herein, the molds are received from the brine tank in rows of five and fed to a tilt table 24 hinged at 25 to a stationary frame 26 upon which is provided a suitable tilting mechanism 27. The tilt table 24 is formed with a longitudinal flange 28 that is adapted to be received beneath the outer extremity of the drainboard 21 and serves to maintain the molds on the tilt table 24 during the tilting operation.

Figure 4:
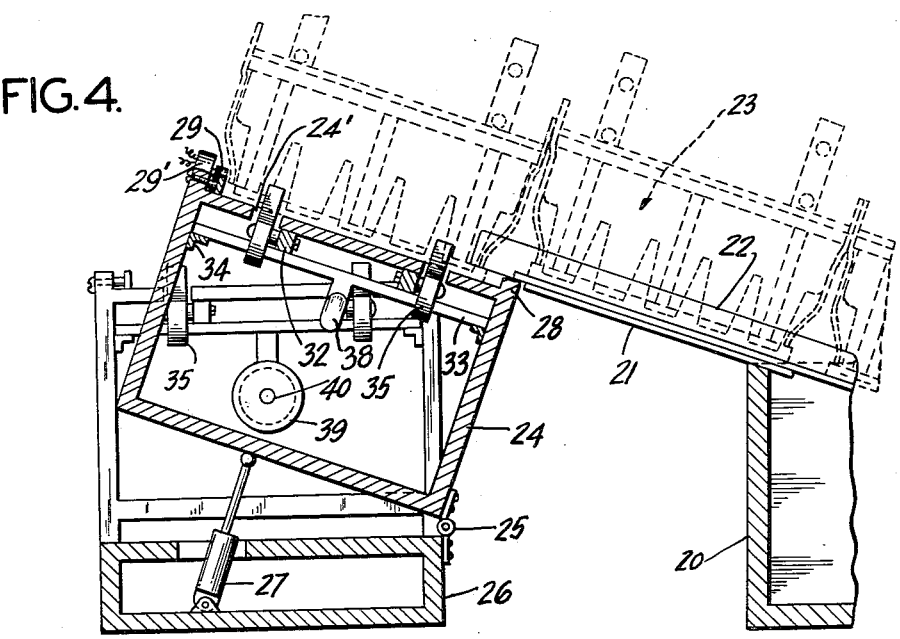
Figure 4 is a partial view in transverse section, taken on the plane indicated by the line 4—4 of Figure 1, and showing the tilting table structure receiving molds from the drainboard of the freezing machine.
Figure 5:
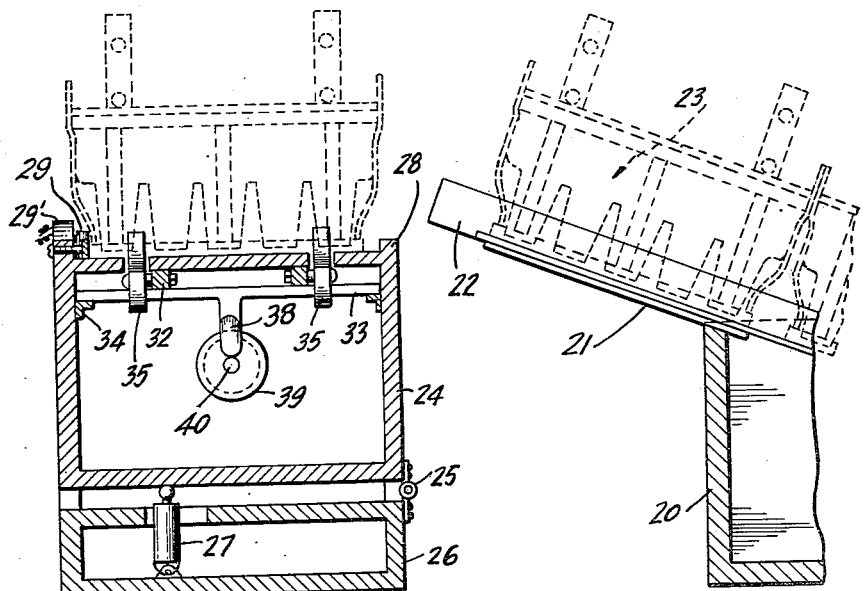
Figure 5 is a view similar to Figure 4, showing the tilting table in its feeding position.

A switch operating plate 29 is provided upon the opposite side of the tilt table from flange 28, and suitable control mechanism (later to be described) is provided to move the tilt table from a tilted position (as shown in Figure 4) to a horizontal position (as shown in Figure 5).

Referring again to Figures 1 and 2, the frame 26 is provided with a stationary horizontal table 30 adapted to align with the top of table 24 when the latter is in its horizontal position.

In order that the molds 23 may be advanced along the tables 24 and 30, a longitudinally slidable frame 31 is mounted beneath the upper surface of table 24. This frame includes spaced bars 32 secured on tie bars 33 that are slidably mounted on guide rails 34. Each bar 32 is provided with a plurality (five in the structure shown) of spaced pivoted dogs 35. Stops 36 cooperate with the respective dogs to limit clockwise movement thereof (as viewed in Figure 2), and each dog is formed with a tooth 37 that is adapted to engage the side wall of an adjacent mold 23, slots 24' being provided in the top of the table 24 to receive the teeth. Movement of the frame 31 to the left, as viewed in Figure 2, thus advances all of the five molds supported upon the tilt table 24 to the left for the distance of the stroke of the frame 31. Return movement of the frame 31 to the right causes the dogs to engage the molds and to be pivoted counterclockwise, thus to pass beneath the bottoms of the molds supported upon the tilt table. Reciprocation of the frame 31 is effected by means of a bifurcated member 38 thereon adapted to be actuated by a flange 39 secured upon a piston 40 of an actuating cylinder 41 (Figure 2).

The cylinder 41 is mounted upon a wall 42 and is received within a slot 43 in an adjacent wall of the tilt table 24 in order that the latter may pivot freely without interference with the cylinder 41.

The cylinder 41 is also utilized to advance the molds across the stationary table 30, a frame 44 being provided as a counterpart to frame 31 actuating additional dogs 45 upon movement of piston 46, the teeth of dogs 45 being received within slots 30' formed in the stationary table 30. By suitably controlling the stroke of pistons 40 and 46, the molds may be properly advanced to the left (as viewed in Figure 2) and fed to a defrosting apparatus illustrated generally at 47.

At this point it should be explained that each mold is provided with an extractor plate 48 within which are secured the stems 49 upon which the frozen comestibles have been formed. The extractor plate is provided with spaced supporting frames 50 having at least one outwardly extending supporting pin 51 upon each side of the frame, the extractor plate 48 being received within the upper portion of the mold 23. In the drawings the frames 50 are shown as being formed with additional pins 51' beneath the pins 51. These lower pins are those now conventionally used on apparatus of this character to position the extractor plates 48 properly within the molds, the pins 51' resting on the side edges of the molds as shown particularly in Figures 3 and 7.

In order that existing equipment may be conveniently adapted for use with this invention, the additional pins 51 have been provided. The existing equipment with which the pins 51' cooperate is shown at 68' in the form of conventional rails. It is contemplated that the extractor plate with the comestibles thereon will be fed to a treating mechanism 52 (Figure 1) where, for example, the comestibles may have a coating applied thereto.

Figure 3:
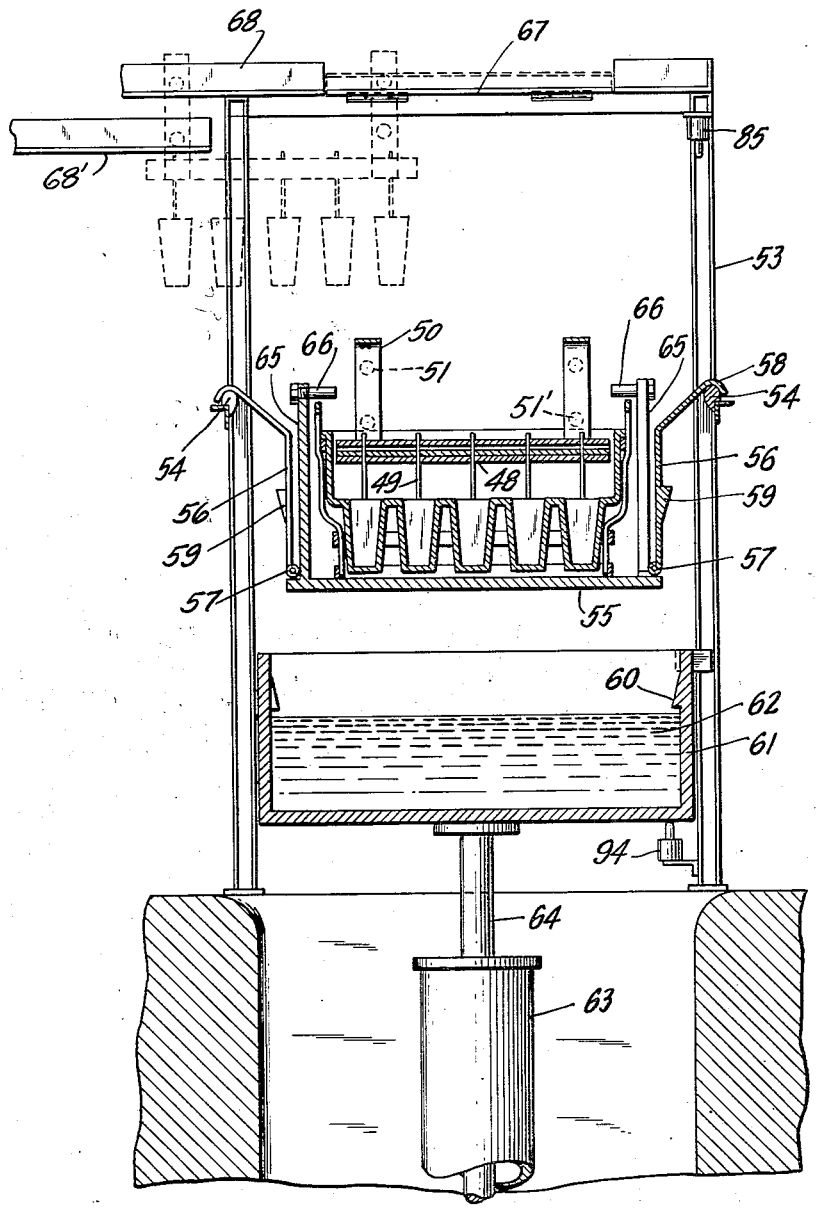
Figure 3 is a view in transverse section, taken on broken line 3—3 of Figure 1, and showing the structure of the defrosting mechanism.

In order that the extractor plate, together with the comestibles attached thereto, may be removed from its mold, the extractor mechanism comprises a frame 53 upon which are provided spaced supporting bars 54. A platform 55 is supported upon the rails 54 by means of hangers 56 pivoted thereto at 57 and formed with hook-shaped extremities 58 which engage the rails 54. When supported upon the rails 54, the platform is in the position shown in Figures 2 and 3 at which time it is adapted to receive the molds from the table 30. The hangers 56 are provided with cam-faced detents 59 that are adapted to be engaged by mating detents 60 formed upon the inner end walls of a tank 61 within which a warming and defrosting bath 62 is adapted to be maintained. The tank 61 is elevated from its normally retracted position, as shown in Figures 2 and 3, by means of a cylinder 63 and piston 64 as hereinafter described.

Upon the platform 55 there are provided end standards 65 having inwardly projecting flanges 66 that are adapted to overlie handles or other elements of the molds 23 in order that the latter may not be lifted from the platform.

In operation, when a mold has been placed upon the platform 55, the tank 61 is elevated into the position shown in Figures 6 and 7. Continued movement of the tank causes the platform and mold to be elevated until they are in the position illustrated in Figures 8 and 9. Just prior to reaching this position, the pins 51 engage and lift pivoted track sections 67 carried by the upper portion of frame 53. After clearing these sections, the latter fall back into their normal positions at which time they provide a continuation of a track 68 by means of which the frames 50 and extractor plates 48 may be conveyed into the device 52. The tank 61 is then lowered to its normal position illustrated in Figures 2 and 3. During the first portion of this lowering motion, the detents 60 engage the detents 59 to carry the platform 55 downwardly with the tank 61. Such downward motion causes the flanges 66 to engage the mold and carry the mold along with the tank. Inasmuch as the surfaces of the comestibles have, by this time, become defrosted, the mold leaves the comestibles which are then suspended from the track sections 67 by pins 51, frames 50, and extractor plates 48. Upon reaching the position shown in Figure 7, the hooks 58 engage the rails 54 and suspend the platform 55 (together with the mold) thereon. In view of the angular shape of the hangers 56, their engagement with the bars 54 will cause the detents 59 to disengage the detents 60 as the platform 55 and tank 61 descend, and continued downward movement of the tank 61 is thus permitted into the position illustrated in Figure 3. The empty mold is then pushed onto a discharge chute 69 by an advancing mold from the table 30.

Figure 11:
Figure 11 is a detail view showing a modified form of extractor supporting mechanism.

In Figure 11 there is illustrated a modified form of track having pivoted track sections 70 instead of the pivoted elements 67. In Figures 12 and 13 there is shown a modified form of mold retaining mechanism upon the platform 55. In this variant posts 71 are provided with star wheels 72 that may be turned by frame elements 73 carried by the molds 23. These star wheels permit the molds to pass between them, but prevent vertical movement of the molds with respect to the platform.

Figure 14:
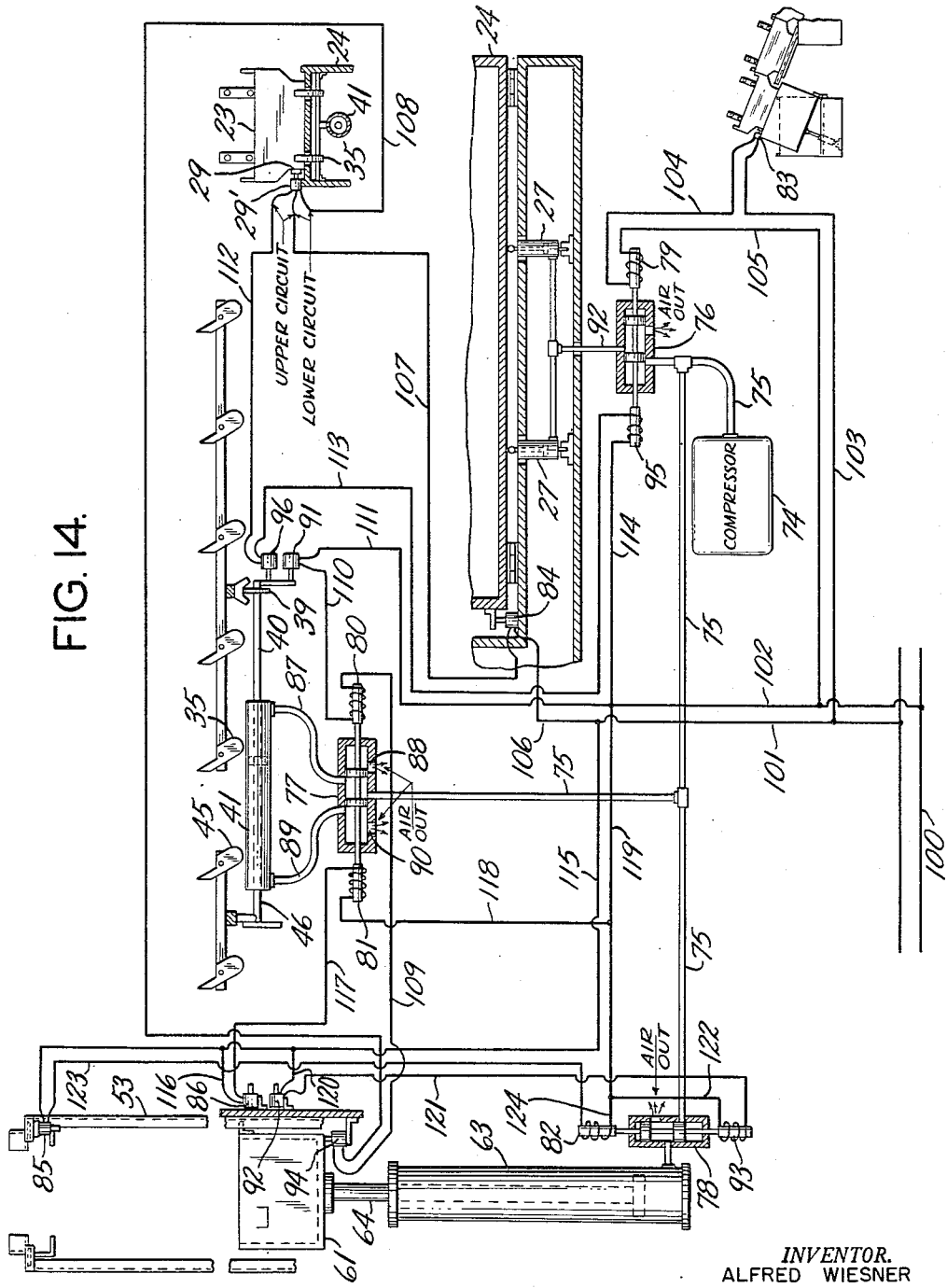
Figure 14 is a schematic view of one form of operating mechanism for the present invention.

Suitable mechanism for controlling and coordinating the movements of the several elements is shown in Figure 14. To this end a source of fluid under pressure (air, for example) is maintained by a compressor 74 which communicates by manifold 75 with solenoid actuated valves 76, 77, and 78. The valve 76 is actuated by solenoids 79 and 95; the valve 77 by solenoids 80 and 81; and the valve 78 by the respective solenoids 82 and 93.

In order that the aforesaid valves and solenoids may be properly controlled throughout the cycle of operation of the machine, a switch 83 is provided upon table 24 and is adapted to be engaged by one of the molds 23 (the extreme right-hand mold as viewed in Figure 1) upon movement of such mold onto the table 24 and into its final position thereon from the inclined drainboard 21. The plate 29 is adapted to actuate a switch 29' which has a double set of contacts which, for convenience herein, will be said to be connected in upper and lower circuits presently to be described.

Upon the frame 26 a pair of switches 91 and 96 are provided, these switches being actuated by the flange 39 upon its extreme right-hand movement, as viewed in Figure 2.

A further switch 84 is adapted to be cosed when the tilt table 24 is restored to its horizontal position, as shown in Figure 5, and switches 92 and 86, also mounted upon the frame 26, are adapted to be actuated by the piston 46 in its extreme left-hand position, as illustrated in Figure 2.

Upper and lower switches 85 and 94 are adapted to be actuated by the brine tank 61 as it moves into its extreme upper and lower positions respectively. Electrical circuits for actuating the solenoids in response to the actuation of the foregoing switches include a power source such as a circuit 100 to which wires 101, 102 are connected. The switch 83 is connected to the wire 101 by a wire 103 and to the solenoid 79 by means of wire 104. A wire 105 serves to connect the solenoid to the power supply 102. The switch 84 is connected to the wire 101 by means of a wire 106 and by means of wire 107 to the middle contact of the switch 29'. The lower circuit of the switch 29' is formed by wire 108 which is connected to the switch 94, this switch also being connected by means of a wire 109 to the solenoid 80 and, from the solenoid 80 to the switch 91 by means of wire 110. Wire 111 then completes the circuit from the switch 91 to the supply wire 102.

The upper circuit of the switch 29' comprises wire 112 which is connected to the switch 91, wire 113 which connects switch 91 to the solenoid 95, and wire 114 which connects the solenoid 95 to the wire 102.

The solenoid 81 assists in controlling the valve 77 which receives power from wire 101 through a wire 115 and a wire 116, switch 86 and wire 117, and the circuit is completed to the wire 102 by means of a wire 118 and a connecting wire 119.

Actuation of the solenoids 82 and 93 is controlled by switches 92 and 85 as follows. The switch 92 is connected to the wire 115 by means of a wire 120 and to the solenoid 93 by means of a wire 121. From the solenoid 93 the circuit is completed by a wire 122 which connects the solenoid 93 to the wire 119. The switch 85 is connected to the wire 115, and the circuit is completed through a wire 123 which is connected to the solenoid 82 and from a solenoid to the wire 119 by means of a wire 124. The operation of the foregoing circuits and the mechanism hereinabove described is as follows.

Upon arrival of the molds onto the tilt table 24, the switch 83 is closed and the plate 29 closes the switch 29'. As a result, the solenoid 79 is energized to move the valve rod of the valve 76 into the right-hand position, as viewed in Figure 14. This permits the escape of fluid into a duct 92 through the vent of the valve 76, and the tilt table 24 recedes into its horizontal position, as viewed in Figure 5. The switch 84 is closed when the table reaches its horizontal position and, inasmuch as the switch 29' is closed, the lower circuit, including the wire 108, is energized. If the switch 94 is closed (indicating that the brine tank is in its lower position) and if the switch 91 is closed (indicating that the piston rod 40 is in its extreme right-hand position, as viewed in Figure 14), the solenoid 80 is energized inasmuch as the lower circuit of the switch 29' is then completed through the wires 106, 107, 108, 109, 110 and 111. Energizing solenoid 80 causes the valve rod of the valve 77 to move to the right, as viewed in Figure 14, and permits fluid to enter the right-hand end of the cylinder 41 through a duct 87, at the same time venting the left-hand end of the cylinder 41 through a duct 89 and vent 90 of the valve 77. The pistons 40 and 46 will thus be moved to the left, causing the molds to be advanced to the left in the fashion hereinabove mentioned and a mold to be placed upon the platform 55. As this motion takes place, the switches 91 and 96 are open causing the solenoid 80 to be de-energized and preventing the solenoid 95 from becoming energized. As the piston rod 46 reaches its left-hand position, the switches 86 and 92 are closed causing solenoid 81 to be energized (by the switch 86) and thus moving the valve rod of the valve 77 to the left to close the vent 91 and connect the duct 89 with the duct 75. At the same time, the duct 87 is vented through a vent 88 of a valve 77, and the piston rods 40 and 46 are moved to the right. The closing of the switch 92 energizes the solenoid 93 to cause the valve rod of the valve 78 to be moved into its lower position, thus connecting the manifold 75 to the cylinder 63 and causing the brine tank to be elevated, opening the switch 94 and preventing the return movement of the pistons 40 and 46 to the left. When the brine tank reaches its upper position, the switch 85 is closed to energize solenoid 82 and move the valve rod of the valve 78 to its upper position, thus closing the connection to the manifold 75 and venting the cylinder 63 to the atmosphere through the vent of the valve 78. In this fashion the brine tank 61 is permitted to fall into its lower position, at which time the switch 94 is again closed, energizing the solenoid 80 and again advancing the molds to the left to place a fresh mold upon the platform 55. This step-by-step motion continues until there are no more molds upon the tilt table 24, and the plate 29 is no longer actuated to close the switch 29'. At this point the lower circuit, including wires 107 and 108, is open, and the upper circuit 112 and 113 is closed, causing the solenoid 95 to be energized while the piston rod 40 is in its right-hand position, as illustrated in Figure 14. and the switch 96 is closed. In this fashion the piston rod of valve 76 is moved to the left to cause fluid to flow from the manifold 75 into the duct 95 and the cylinders 27 thus to elevate the tilt table 24 into the position illustrated in Figure 4, and the cycle of operation, as above described, repeated.

While the invention has been described with specific reference to the accompanying drawings, it is not to be limited save as defined in the appended claims.

I claim:

1. Defrosting mechanism, comprising a frame, an open ended tank mounted on the frame for vertical movement therein, means to move the tank from a first position at the bottom of the frame to an elevated position, a platform on the frame to receive a mold, said platform and mold thereon being received within the open ended tank during the vertical movement thereof, the tank thereby raising the platform and mold to said elevated position, means on the platform to engage a mold and prevent vertical movement of the mold with respect to the platform, means at the top of the frame to receive and support extractor means carried by the mold, and latch means between the tank and platform to cause the platform to be moved downwardly and away from the extractor means.

2. A device, according to claim 1, wherein movable brackets are provided on the platform to support the latter on the frame and wherein complementary interengaging means are provided on the tank and the platform to lock them together during the upward travel thereof, the movement of the brackets upon their reengagement with the frame during the downward travel of the tank releasing the interengaging means.

3. A device, according to claim 1, wherein movable brackets are provided on the platform to support the latter on the frame and wherein interengaging detents are formed on the brackets and tank to cause the platform to be moved downwardly and away from the extractor means, the detents interengaging during the upward travel of the tank and the platform, and the engagement of the movable brackets with the frame during the downward travel of the platform disengaging the detents.

4. Defrosting mechanism, according to claim 1, wherein the means to support the extractor means comprises a track having a retractible section and track engaging means on the extractor to move against and then rest upon the retractible track section.

5. Defrosting mechanism, according to claim 1, including means mounted on the frame to support the platform in a normal mold receiving position and above the tank.

6. A device, according to claim 2, wherein the brackets are hinged on the platform and normally swing outwardly away from the platform to engage the frame for the support of the platform thereby.

7. A device, according to claim 2, wherein the brackets are hinged on the platform and normally swing outwardly away from the platform to engage the frame for the support of the platform thereby, and wherein there are provided interengaging detents on the brackets and inner walls of the tank to cause the platform to move downwardly with the tank.

8. Defrosting mechanism, according to claim 1, wherein the tank moving means comprises a cylinder and piston, means to raise the piston upon moving a mold onto the platform, and means to lower the piston upon movement of the platform into its elevated position.

9. Defrosting mechanism, according to claim 1, wherein step-by-step means is provided to feed molds onto the platform.

10. Defrosting mechanism, according to claim 9, wherein the step-by-step means actuates the means to move the tank.

11. In a defrosting mechanism for refrigerated molds the combination of a frame, a tank containing a defrosting bath mounted on the frame for vertical movement therein, said tank having an open upper end, means for raising the tank, a platform normally positioned above the tank in mold receiving position, the shape and size of said platform being such as to permit the platform to be received in the upper open end of the tank, means for advancing the refrigerated molds intermittently to the platform, means controlled by the advancing of the refrigerated molds to operate the tank raising means when a mold has been delivered to the platform, means controlled by the raising of the tank for rendering the mold advancing means inoperative, the tank in its upward travel receiving the platform and the mold within its upper open end, immersing the mold in the defrosting bath and transporting the platform and mold therein to an upper position where the contents of the mold is removed, means controlled by the arrival of the tank at the upper position for rendering said tank raising means inoperative, the tank and platform thereafter returning to their respective lower positions, means for removing the mold from the platform, and means actuated by the return of the tank to its lower position to activate the mold advancing means to deliver another refrigerated mold to the platform.

12. In a defrosting mechanism for refrigerated molds, the combination of a platform to receive refrigerated molds, a tank containing defrosting means normally disposed below the platform, said tank having an upper open end, means for raising the tank, said tank during the upward travel thereof receiving the platform and mold therein and transporting the platform and mold to an upper position where the contents of the mold is removed, means for removing the empty mold from the platform and means controlled by the tank upon its return to lower position for supplying a full mold to the platform.

13. Defrosting mechanism comprising a frame, an open-ended tank mounted on the frame for vertical movement therein, means to move the tank from a first position at the bottom of the frame to an elevated position, mold-receiving means supported by the frame above the tank, said mold-receiving means and the mold received thereby being received within the open-ended tank during the vertical movement thereof, the tank thereby raising the mold-receiving means and mold to said elevated position, means for operatively connecting the mold-receiving means and the mold to insure that the mold will descend with the mold-receiving means during the downward movement of the tank from the elevated position to said first position, means at the top of the frame to receive and support extractor means carried by the mold, and means to operatively connect the tank and the mold-receiving means to cause the mold-receiving means to be moved downwardly away from the extractor means during the downward travel of the tank.

References Cited in the file of this patent

UNITED STATES PATENTS

| | | |
|---|---|---|
| 1,200,244 | Sears | Oct. 3, 1916 |
| 1,834,760 | Behringer et al. | Dec. 1, 1931 |
| 2,113,581 | Eddy | Apr. 12, 1938 |
| 2,135,778 | Wyland | Nov. 8, 1938 |
| 2,614,510 | Heise | Oct. 21, 1952 |
| 2,648,421 | Vitz | Aug. 11, 1953 |